UNITED STATES PATENT OFFICE.

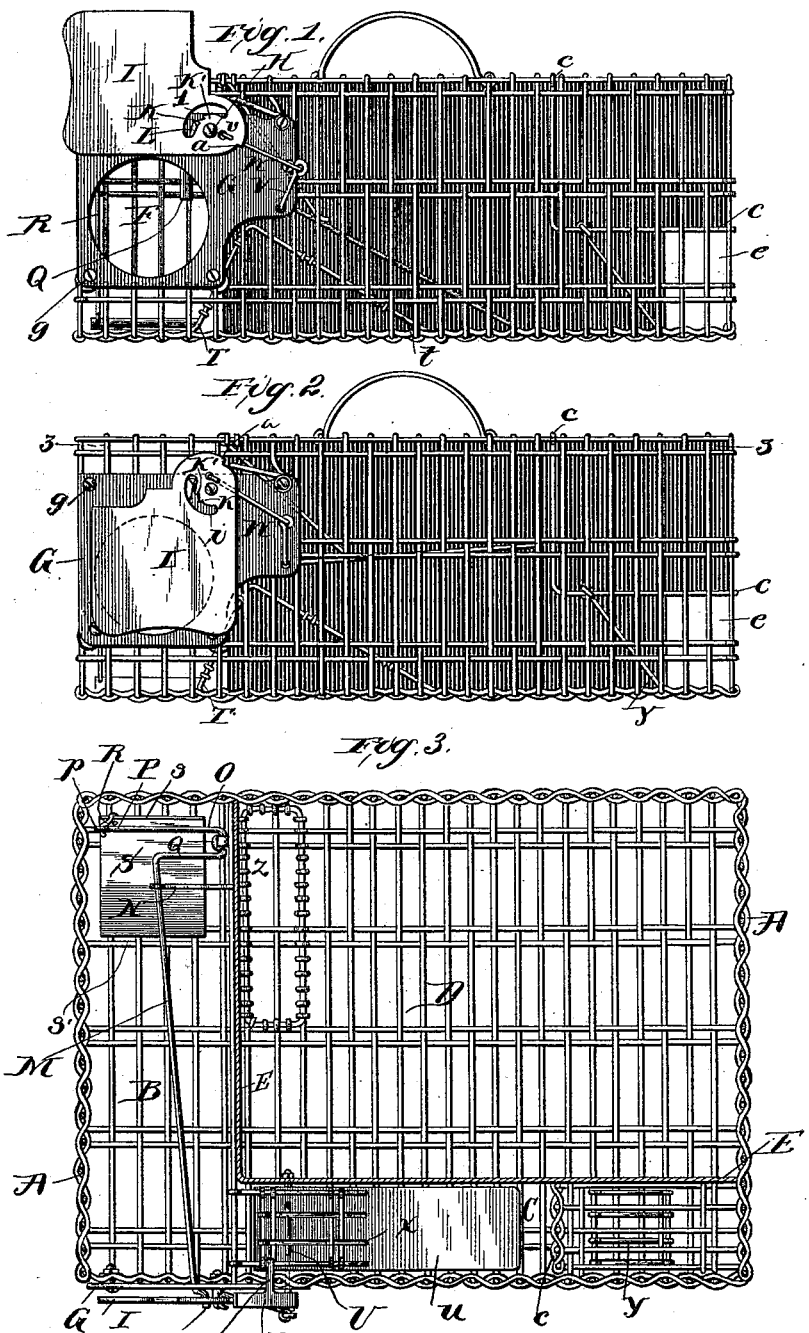

CHARLES FRANKE, OF CHICAGO, ILLINOIS.

ANIMAL-TRAP.

SPECIFICATION forming part of Letters Patent No. 514,068, dated February 6, 1894.

Application filed March 8, 1892. Serial No. 424,187. (Model.)

*To all whom it may concern:*

Be it known that I, CHARLES FRANKE, a citizen of the United States, residing at Chicago, in the county of Cook and State of Illinois, have invented certain new and useful Improvements in Animal-Traps, of which the following is a full, clear, and exact specification.

My invention relates to that class of animal traps in which there is a compartment into which the animal first enters to get at the bait, and in approaching the bait entraps himself in such compartment; and with which compartment communicates a collecting cage or chamber, the entrance to which is designed to permit the animal to enter such cage, but to preclude his escaping therefrom.

More particularly my invention relates to a device of this nature for entrapping rats and mice and it has for its primary object to provide improved means for causing the trap to be set for the reception of another animal, by the passage of the animal already entrapped from the entrance compartment into the collecting cage.

It also has for its object to improve the means for preventing the animal from escaping from the collecting cage back into the entrance compartment, whereby all possibility of the animal retracing its steps after once leaving the entrance compartment, is precluded with absolute certainty.

My invention consists in certain features of novelty in the construction and combination of parts by which these objects and certain other objects of minor importance, are attained, hereinafter more fully described with reference to the accompanying drawings and particularly pointed out in the claims.

In the said drawings, Figure 1, is a side elevation of my improved trap, looking into the entrance compartment, the trap door being set. Fig. 2 is a similar view, showing the trap door sprung or lowered, and Fig. 3, is a sectional plan taken on the line 3—3, Fig. 2.

In the drawings, wherein like signs of reference refer to like parts throughout the several views, A indicates the outer wall or casing of the trap, which may be constructed of woven wire, in cage-like form or of any other suitable material, which casing is divided as shown in plan in Fig. 3, into three compartments, B, C, D, by means of an L shaped partition, E. The compartment D is what I have termed the entrance compartment and it is provided at one end with a door-way or opening, F, which is preferably formed in a plate G, secured to the outer wall of casing A, by means of rivets or screws, *g*, or in any other suitable manner. Secured near the upper side of the plate G, by means of a pivot H, is a swinging door I, which is adapted to rotate upon such pivot into the position shown in Fig. 2 and close the entrance or door-way F to the compartment B. Preferably concentric with the pivot H, the door I is provided with a slot *i*, in the edge of which are formed a number (preferably two) ratchet teeth or notches K, K', which co-operate with a dog or pawl L for holding the door in its set or elevated position. As more clearly shown in Fig. 3, this dog L constitutes the extremity of a short crank formed on the end of a rod or bar M, which latter is journaled at one end in the plate G and at or near its other end in a fixed arm N secured to the frame of the trap in any convenient manner, thus constituting a latch. The rear end of this bar M is provided with two crank arms, O, P, which are preferably formed by bending the bar M into a U shaped portion, substantially at right angles thereof, one stroke or arm of the U extending in the opposite direction beyond the axis of the bar M, so as to form the crank P. From the bend of the U shaped portion of the crank O, is suspended a weight or counter-balance, Q, for the purpose of holding the dog L normally in engagement with the ratchet teeth K, K'; and at the extremity of the crank P, is formed an eye *p*, in which is linked a rod R, to whose lower end is hooked a platform S, upon which the animal will tread in approaching the bait. The rear edge, *s*, of this platform is normally held elevated or aloof from the bottom of the trap by the counter-balance or weight Q, while its forward end *s'* is free to rest upon the bottom of the trap, or, if desired, it may be hinged thereto; thus constituting a trigger, which, when the animal's weight is applied thereon, causes the dog L to disengage the ratchet tooth K or K' and permit the door I to swing downward before the entrance F.

Located in the compartment C, which I will term a passage way, adjacent to the compartment B' is an incline T, preferably constructed of wire, braced at its upper end by means of the inclined wires $t$ and extending upward in the passage C and partially closing its end, so as to leave above the incline T an exit from the chamber B into such passage C. Secured to a rock shaft U, journaled in the partition E and plate G, is a tilting platform $u$, which, when the door I is open or set, rests at its lower end against the bottom of the trap, as shown in Fig. 1, but when such door is closed, it occupies an elevated or horizontal position, as shown in Fig. 2. I accomplish this automatic movement of the platform $u$ and door by connecting a crank-arm V on the shaft U to a projection $v$ of the door, by means of a link or rod W. The platform $u$ being so arranged that the animal necessarily treads upon it, or walks along it, in its course to the collecting chamber such platform virtually forms a part of the floor of the passage C,—the only connection between the passage C and the chamber B, through which the animal can pass, being above the platform. Thus, it will be seen that after the animal has sprung the trap, leaving the exit above the incline T his only means of escape, he will naturally climb up such incline onto the platform $u$, which at this time will be in its horizontal or elevated position, and his weight will cause such platform to again descend to its lowermost position, shown in Fig. 1, and thereby elevate and set the door I, which will be automatically engaged by the dog L and held in its open position for the reception of other animals. Naturally, the animal upon feeling the platform $u$ give way under his weight, will endeavor to back out of the passageway C again into the compartment B, and in order to preclude such a movement, I hinge above the platform $u$ to the top of the trap, a set of inclined spears X, having the form of a door, completely closing the passage C above the platform $u$, but being turned or inclined into the passage C, so that the animal will be free to enter such passage but will be caught by such spears X, when attempting a retrograde movement; and in order that the door I may be locked until the animal has raised the spears X and passed into the passage C, I provide the projection $v$ with a notch or tooth $a$, with which engages a pawl or dog $b$ when the door swings downward into its lowermost position; and on the inner side of this dog or pawl $b$ is formed a projection $b'$, which extends between the wires of the cage into the passage C, so as to be engaged by the door X when the latter is raised, and thereby elevate the dog $b$ and permit the door to ascend.

It sometimes happens that owing to the insufficiency of the animal's weight or size or to other causes, the platform $u$ will fail to descend far enough to open the door I all the way, and in order that the door I may be opened at least a portion of the way, so as to prevent the dog $b$ from again engaging the notch $a$, and thereby permit other animals to slip into the compartment B, under the door, I have furnished the edge of the slot $i$ with a number of teeth as described, so that if the lower one, K, should not engage over the dog L, the door would be held partially open by the upper one, K'.

One great difficulty with traps of this character heretofore, has been that the animals, especially rats, after passing the hinged spears, such as X, manage to lift such spears and work their way back into the entrance compartment; and in order to guard against possibility of escape in this manner, I have provided the passage-way C, which is so narrow as to preclude the animal's turning therein and going through the necessary maneuvers for getting under the spears X. Hence, his only alternative is to go forward in such passage way, and I therefore provide the extreme end of this passage-way with an exit, $e$, formed through the partition E, which leads into the compartment D, constituting the collecting cage. The passage-way C just above, the exit $e$ is partitioned off by means of an L shaped partition $c$, so as to further contract the passage-way C, and hinged to the horizontal portion of this partition $c$, is a door Y, provided like the door X, at its lower end, with suitable spears and being inclined in the same direction as the door X and resting upon the bottom of the trap, so that the animal will be free to enter the contracted portion of the passage-way C and then enter the collecting cage D via the exit $e$; but by reason of the contracted approach from the collecting cage to the door Y, it will be impossible for the animal to lift said door Y and again enter the passage C.

The partition E is preferably imperforate or composed of sheet metal, so as to better define the course which the animal should take to enter the collecting cage.

The bait may be placed in a suitable basket, Z, in the collecting cage, adjacent to the platform S, the partition E at this point being provided with apertures for the exposure of the bait, or, if desired, such bait basket may be located at any suitable point within the entrance compartment B.

Having thus described my invention, what I claim as new therein, and desire to secure by Letters Patent, is—

1. In an animal trap, the combination with the entrance compartment having a door and latch for holding such door open or set, of a trigger in said compartment for disengaging said latch, a passage-way connecting with said compartment, a pivoted platform in said passage-way connected to and operating in unison with the door whereby the falling of the platform will open the door and means for preventing the exit of an animal from such passage-way back into the compartment B, substantially as set forth.

2. In an animal trap, the combination with an entrance compartment having a door, of a latch for holding said door open or set, a trigger for disengaging said latch, a collecting chamber, and an elevated tilting platform interposed between said entrance compartment and collecting chamber and having operative connection with said door, said entrance compartment and collecting chamber having a communicating passageway above said platform, substantially as set forth.

3. In an animal trap, the combination with the entrance compartment having a door, of a latch for holding such door open or set, a trigger in said compartment for disengaging said latch, the collecting cage, a passage-way connecting said entrance compartment and collecting cage, a tilting platform in said passage-way connected to and operating in unison with said door, whereby the falling of the platform will open the door and spears projecting into said passage-way for preventing escape from said passage into the said compartment, substantially as set forth.

4. In an animal trap, the combination with the entrance compartment having a door, of a latch for holding said door open or set, a trigger remote from said door connected with said latch, the collecting cage, a passage-way communicating with said compartment and collecting cage, an incline in said passage-way, a tilting platform in said passage-way above said incline, connected to and operating in unison with said door, and pivoted spears resting upon said tilting platform, substantially as set forth.

5. In an animal trap, the combination with the entrance compartment having a door, of the latch for holding said door open, a trigger in said entrance compartment connected with said latch, a collecting cage, a passage-way connecting such cage with said compartment, a tilting platform in one end of said passage-way connected to and adapted to operate in unison with said door, said passage-way being contracted at its other end, and pivoted spears arranged in said contracted portion, substantially as set forth.

6. In an animal trap, the combination of the entrance compartment having a door provided with a notch or tooth, the journaled rod M having a dog or pawl adapted to engage said tooth for holding the door open, a crank-arm on said rod, a weight for rotating said rod in one direction and a platform connected with said crank-arm for rotating the rod in the opposite direction, substantially as set forth.

7. In an animal trap, the combination with the compartment B having a pivoted door provided with a tooth or notch, of the rod M, the arm N in which said rod is journaled, a crank-arm terminating in a pawl or dog at one end of said rod for engaging said tooth or notch, two crank-arms at the other end of said rod, a weight secured to one of said latter crank-arms and a platform suspended at one end by the other of said latter crank-arms, substantially as set forth.

8. In an animal trap, the combination with the entrance compartment, of the pivoted door for closing said compartment, having the projection $v$ and a latch for holding the door elevated, a passage-way connected with said compartment, a tilting platform in said passage-way and a crank-arm connected with said tilting platform and with said projection $v$, substantially as set forth.

9. In an animal trap, the combination with the entrance compartment, of a pivoted door for closing said compartment, having the projection $v$ and a latch for holding the door elevated, a passage-way connected with said compartment, of a tilting platform in said passage-way, and a crank-arm connected with said tilting platform and with said projections $v$, communication between the compartment and the passage way being closed below said platform, substantially as set forth.

10. In an animal trap, the combination with the entrance compartment, of a door for closing said compartment, a latch for holding said door open, a trigger for disengaging said latch, a passage communicating with the entrance compartment, a tilting platform in said passage connected with said door, spears pivoted above said tilting platform, and a dog for locking said door in its closed position, adapted to be disengaged by an animal in passing over said platform, substantially as set forth.

11. In an animal trap, the combination with the entrance compartment; of a door for closing said compartment having a number of notches, a latch for engaging said notches for holding the door open, a trigger for disengaging said latch, and a tilting platform connected with said door for opening the latter, substantially as set forth.

12. In an animal trap, the combination of the entrance compartment having a door, a trigger in said compartment for closing said door, a tilting platform connected to and adapted to operate in unison with said door, and a second compartment having a communicating opening with the first compartment, located above said platform, substantially as set forth.

CHARLES FRANKE.

Witnesses:
F. A. HOPKINS,
R. C. OMOHUNDRO.